United States Patent [19]

Perez

[11] Patent Number: 5,349,995
[45] Date of Patent: Sep. 27, 1994

[54] USED OIL COLLECTING DEVICE

[76] Inventor: Fernando Perez, 5101 SW. 139th Ct., Miami, Fla. 33175

[21] Appl. No.: 106,661

[22] Filed: Aug. 16, 1993

[51] Int. Cl.⁵ ............................................. B67C 11/00
[52] U.S. Cl. .................................... 141/98; 141/330; 141/337; 141/339; 141/333; 141/340; 222/83.5; 184/1.5; 280/727
[58] Field of Search ............... 141/329, 330, 340, 339, 141/337, 333, 334, 231, 98; 222/87, 81, 83.5; 184/1.5, 106; 280/727, 762

[56] References Cited

U.S. PATENT DOCUMENTS

| | | | |
|---|---|---|---|
| 2,138,046 | 11/1938 | Taylor | 141/330 |
| 2,138,844 | 12/1938 | Erb | 141/330 |
| 4,031,032 | 6/1977 | Jablecki | 141/344 X |
| 4,267,945 | 5/1981 | Maynard, Jr. | 222/83.5 |
| 4,600,125 | 7/1986 | Maynard, Jr. | 222/81 |
| 4,620,576 | 11/1986 | Owen, Jr. | 141/330 X |
| 4,702,290 | 10/1987 | Perez | |
| 4,706,719 | 11/1987 | Eversdijk | 141/98 |
| 4,970,817 | 11/1990 | Mansfield | 141/340 |
| 5,099,872 | 3/1992 | Tarvin et al. | 141/337 X |
| 5,111,910 | 5/1992 | Sheppard, Jr. | 184/1.5 |
| 5,125,536 | 6/1992 | Winder | 222/83.5 |

Primary Examiner—Ernest G. Cusick
Attorney, Agent, or Firm—J. Sanchelima

[57] ABSTRACT

A device for collecting oil contained in plastic containers that are placed inside a housing that includes a puncturing assembly mounted to a slanted platform. The platform has a central opening through which the discharged oil passes. A flexible conduit is connected to the outlet in the housing at one end and the other end of the flexible conduit is connected to a storage tank with sufficient capacity to store a substantial amount of oil. A hingedly mounted cover in said housing helps in the urging and pressing of the plastic container against the puncturing assembly. The puncturing assembly includes a separator to ensure the faster rate of unit flow of the oil from the container.

7 Claims, 3 Drawing Sheets

FIG - 1 -

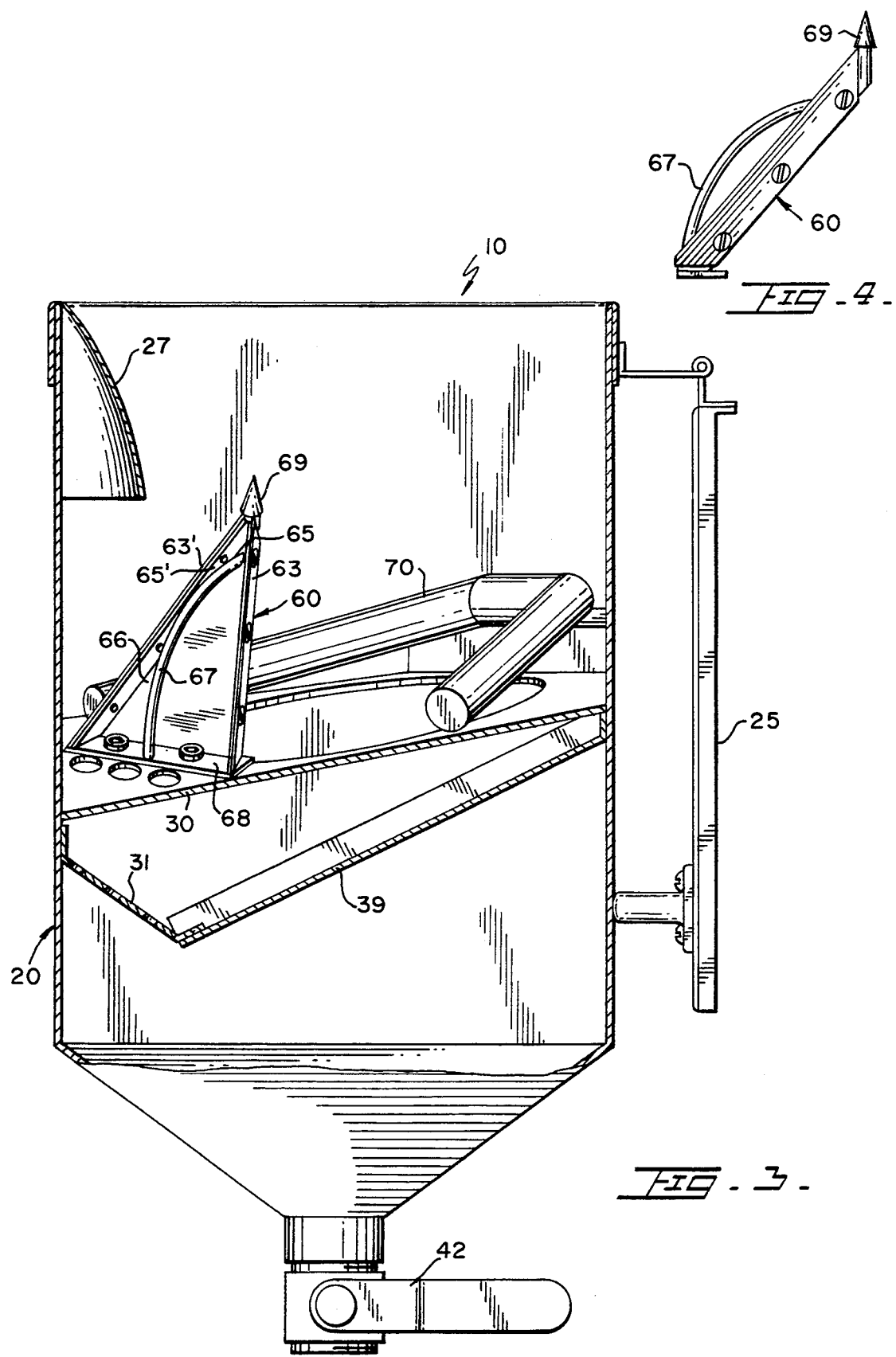

USED OIL COLLECTING DEVICE

BACKGROUND OF THE INVENTION

1. Field of the Invention

The present invention relates to devices for collecting used oil.

2. Description of the Related Art

The problem of properly disposing of the oil used in vehicles has silently become an issue in many communities and several government agencies have studied the problem. If the problem of disposing of waste oil remains intractable, compulsory practices will be required to solve this ecological problem.

One of these solutions was invented by the present inventor as disclosed in U.S. Pat. No. 4,702,290 issued on Oct. 27, 1987 and entitled: "Container for Collecting Oil". The said patented invention has been sold to thousands of users that have used conventional plastic milk containers to properly dispose of their used oil. Several government agencies have already expressed their inclination to use the standard one-gallon milk container as their standard container for the collection of oil. However, there are not many centers for receiving the oil. Also, many times the collection centers are far away from the user's home. It is therefore more convenient and efficient to provide for the collection of these containers through the waste disposal trucks that service our communities periodically. The need of a device for collecting these used oil containers and keep the oil separate from the rest of the waste material is clear.

SUMMARY OF THE INVENTION

It is one of the main objectives of the present invention to provide a device for collecting used oil stored in plastic gallons that can be readily used with the minimum manipulation on the part of the user.

It is another object of this invention to provide such a device that can readily puncture the plastic container, drain it and stored the oil in a storage tank.

It is still another object of the present invention to provide such a device that can be mounted in a conventional waste disposal truck so that the containers can be readily collected and the oil stored separate from the plastic container which can then be processed with the rest of the waste material.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a side partial cutaway view of the present invention.

FIG. 4 depicts a side view of the puncture assembly.

DETAILED DESCRIPTION OF THE PREFERRED EMBODIMENT

Figure 1:
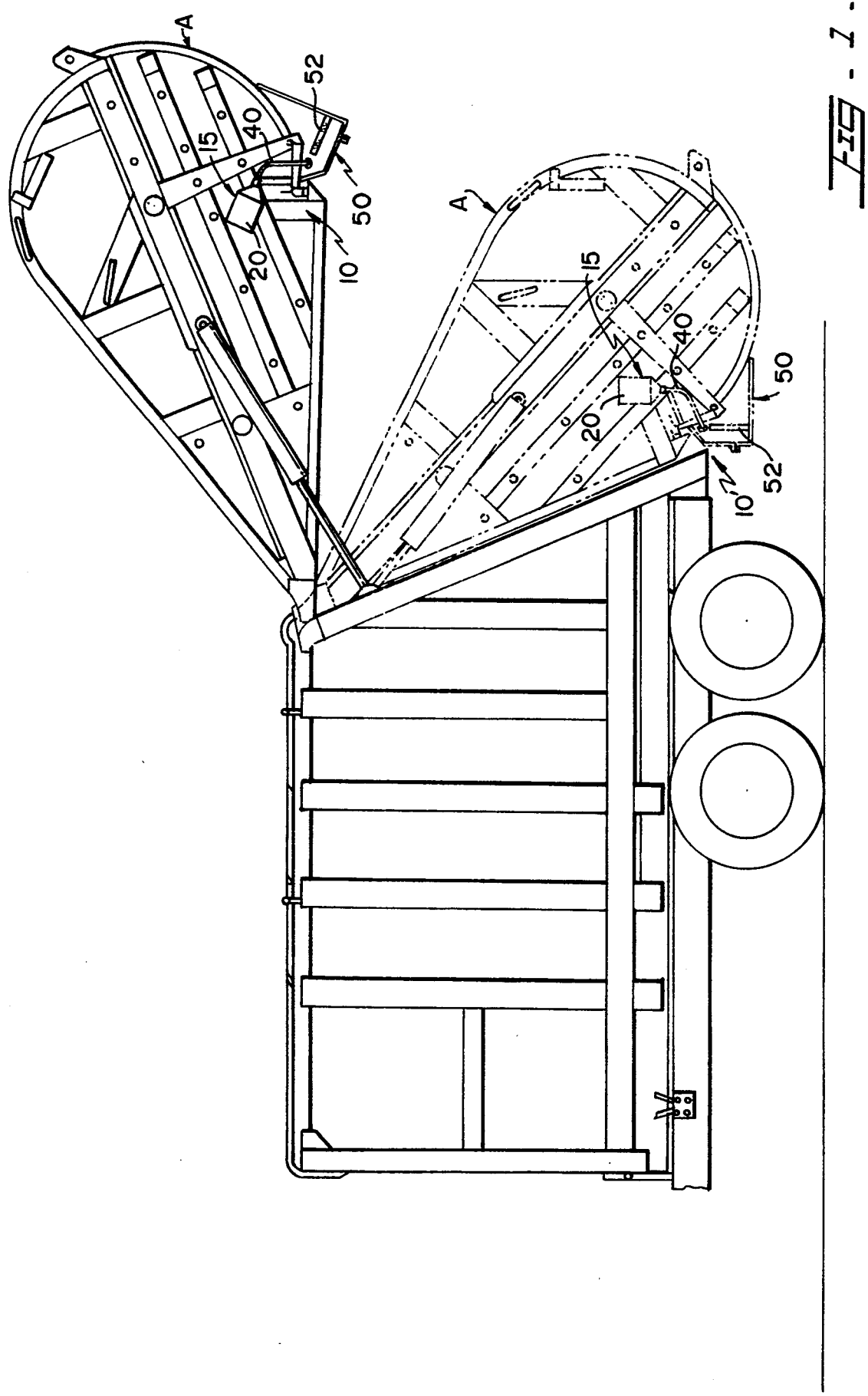
FIG. 1 represents a side elevational view of the rear of a waste disposal truck where the present invention has been installed.

Referring now to FIG. 1, it can be seen that the present invention is referred to with numeral 10 and 10' and is shown mounted on the rear moving assembly A of a waste disposal truck. The two extreme positions for assembly A are show in FIG. 1. The uppermost position of assembly A is shown with solid lines and the lowermost position is represented with phantom lines. These trucks collect the used oil contained in milk containers (see Fernando Perez U.S. Pat. No. 4,702,290 issued on Oct. 27, 1987) so that they can be brought to a central processing center. Device 10 basically includes receptacle assembly 15, storage tank assembly 50 and flexible conduit 40 connecting them. Preferably, there is one receptacle assembly 15 on each side of the truck and receptacle assembly 15 is connected through a sufficiently long and flexible conduit 40 to one storage tank 50. Each storage tank 50 has a level tube 52 to allow the user to tell when tank 50 is full. When one of the two receptacle assemblies 15 is used, the other permits the air to come out of storage tank, thereby permitting the oil to flow in.

Figure 2:
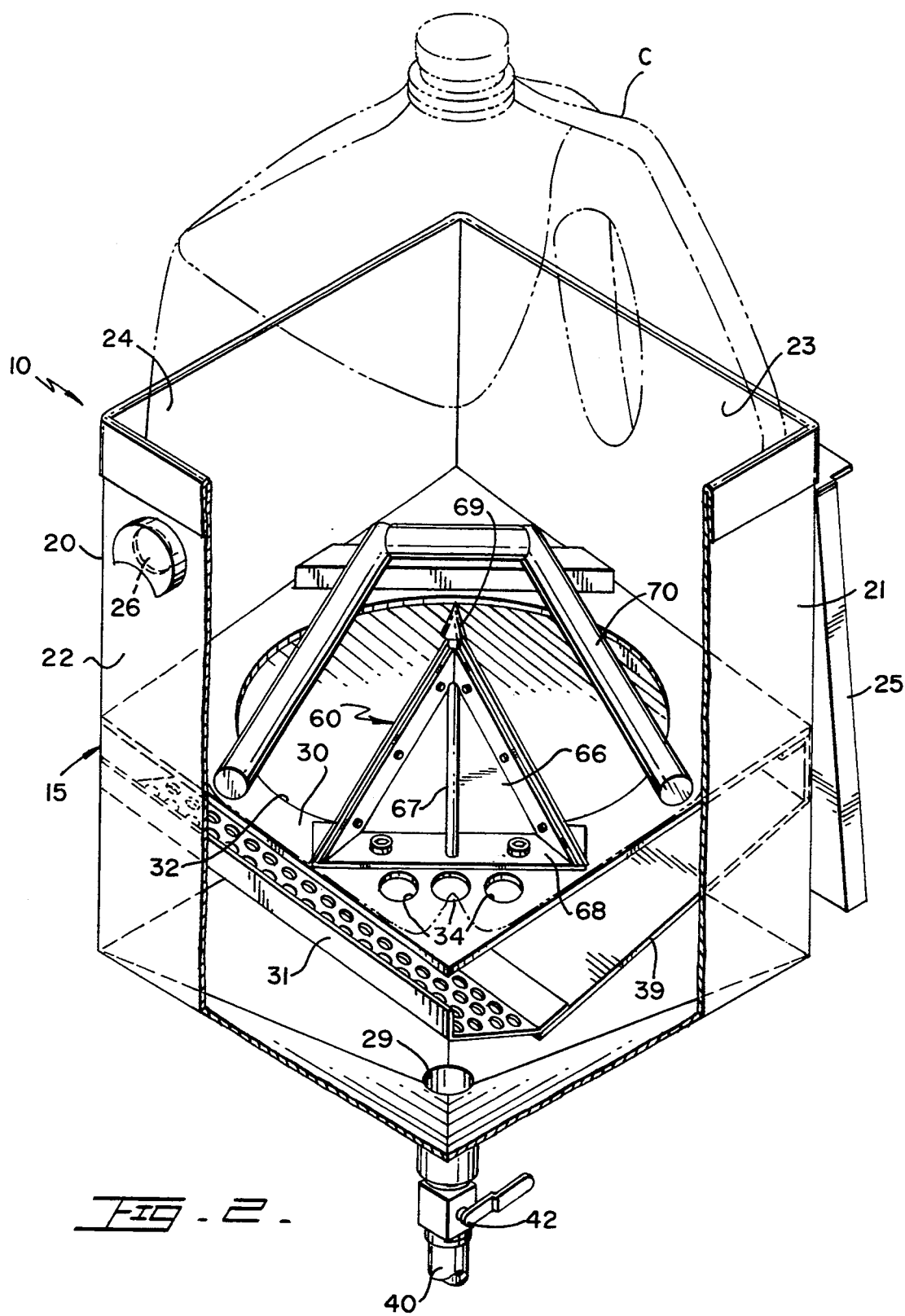
FIG. 2 shows a partial cutaway view of the present invention.

Referring now to FIGS. 2 and 3 it can be seen that receptacle assembly 15 includes, receiving housing 20 having four lateral walls 21; 22; 23 and 24, a hingedly mounted cover 25 and slanted platform 30 that includes central opening 32 and relief openings 34. Lateral wall 22 includes venting port 26. Splash guard member 27 is mounted inside housing 20 and close to puncturing assembly 60. Its purpose is to minimize liquid splashing that may come outside housing 20. Below platform 30, the bottom of housing 20 is formed with a constrained portion that urges the oil towards it. Outlet 29 is connected to gate valve 42 and which is connected to flexible conduit 40. Flexible conduit 40 is connected to storage tank 50. Tank 50 is capable of storing several gallons of oil. Valve 42 is convenient to facilitate the cleaning of receptacle assembly 15.

Referring now to FIG. 3, it can be seen that baffle member 39 urges oil received from central opening 32 and relief openings 34 to outlet 29. However, screen 31 stops solids from passing into tank 50. Baffle member 39 prevents oil residues from going through central opening 32 when assembly A is lifted. Platform 30 includes puncturing assembly 60 that is cooperatively disposed to puncture the oil filled milk containers when the container is placed over it and the container is pushed against assembly 60. Oil flows mostly through central opening 32 and the displaced air is pushed out through central opening 32 and/or relief openings 34.

Referring now to FIGS. 3 and 4, it can be seen that puncture assembly 60 includes a wire separator member 67 to hold the slit in the punctured milk container open thereby permitting the oil through at a faster rate. Without separating member 67 the slit or cut remains sealed by puncture assembly 60. In the preferred embodiment, assembly 60 includes blade members 63 and 63' held by blade holders 65 and 65'. Blade members 63 and 63' are joined at the point and it has been found that this arrangement has given good results in cutting the milk containers. Plate 66 and base 68 improve the structural integrity of assembly 60. Puncturing element 69 further facilitates rupturing the milk containers.

Reinforced squeezing member 70 has substantially a "U" shape and it provides a solid area against which the milk container is squeezed. Also as best seen in FIGS. 2 and 3, the separation of member 70 from platform 30 prevents the sealing of central opening 32 by the milk container C.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for collecting oil contained in plastic containers mounted on a waste disposal truck having a moving rear assembly and said device mounted to said assembly, said device comprising:
    A) housing means for receiving said plastic containers and including means for puncturing said plastic containers, said housing means including a bottom having an outlet and said housing means being mounted to said moving rear assembly;
    B) flexible conduit means having two ends and one of said ends being connected to said outlet; and
    C) tank means for storing said oil connected to the other end of said flexible conduit means and said tank means being mounted to said moving rear assembly so that said tank is below said housing means at all positions of said moving rear assembly.

2. The device set forth in claim 1 wherein said housing includes a platform member wherein said means for puncturing said plastic containers is mounted and said platform member includes a central opening to permit the oil from said plastic containers to go through.

3. The device set forth in claim 2 wherein said bottom includes a constrained portion that terminates with said outlet.

4. The device set forth in claim 3 wherein said housing means includes a hingedly mounted cover to protect said housing means.

5. The device set forth in claim 4 wherein said plastic container is a conventional one-gallon milk container.

6. The device set forth in claim 5 wherein said platform member is inclined and said means for puncturing said plastic containers is mounted on the portion of said inclined platform member that is closer to said outlet.

7. The device set forth in claim 6 wherein said housing means has a cross-section that is similar and slightly larger than the cross-section of said plastic containers so that four corners are defined within said housing means and said means for puncturing said plastic containers being positioned in one of said corners.

* * * * *